Dec. 9, 1930.  J. B. BANDER  1,784,168
READING GLASS
Filed June 4, 1928   2 Sheets-Sheet 1

INVENTOR
Jacob B. Bander
BY C. Campbell Hunicke
ATTORNEY

Dec. 9, 1930.  J. B. BANDER  1,784,168
READING GLASS
Filed June 4, 1928   2 Sheets-Sheet 2
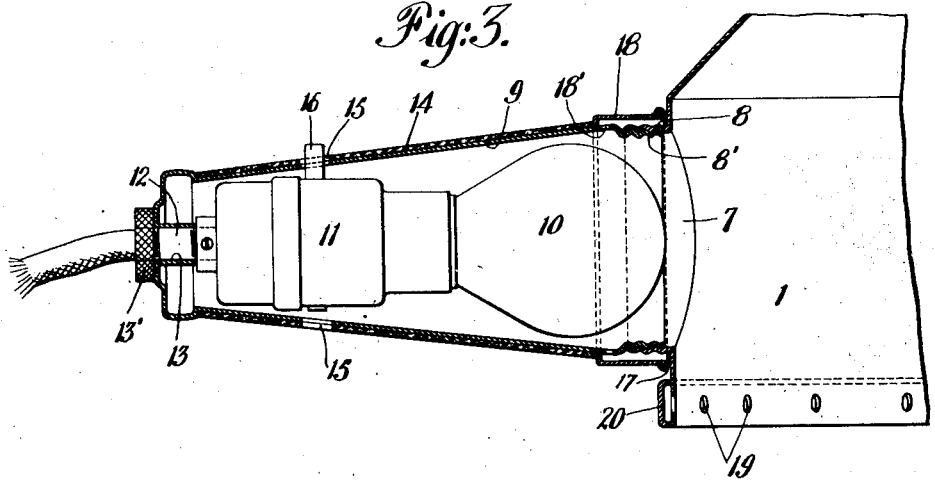
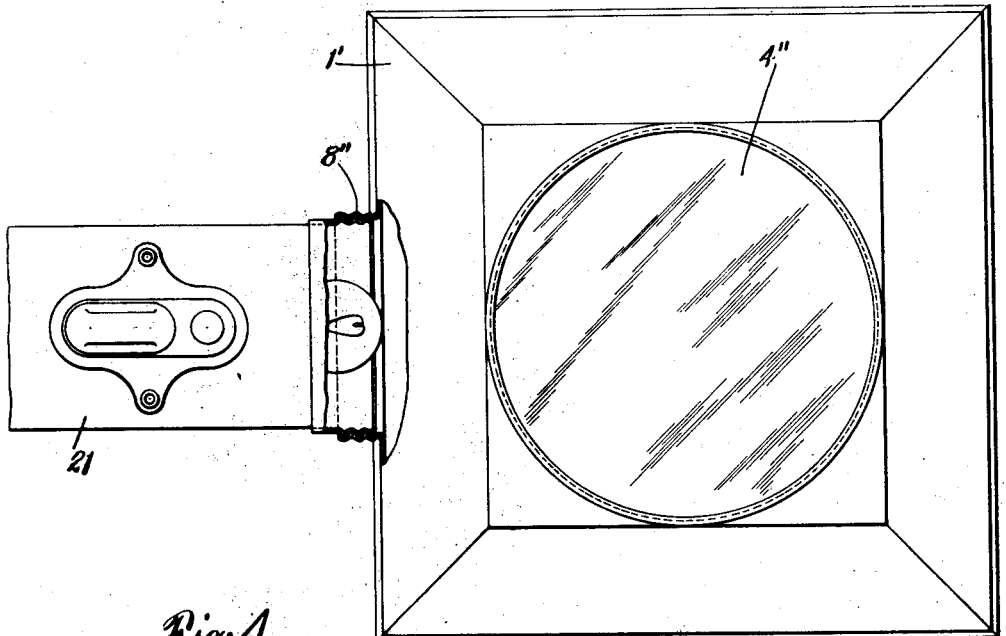
INVENTOR
Jacob B. Bander
BY C. Campbell Hunnock
ATTORNEY Patented Dec. 9, 1930

1,784,168

UNITED STATES PATENT OFFICE

JACOB B. BANDER, OF NEWARK, NEW JERSEY, ASSIGNOR OF ONE-HALF TO CHRISTIAN BERGER, OF BROOKLYN, NEW YORK

READING GLASS

Application filed June 4, 1928. Serial No. 282,531.

This invention relates to a reading glass.

Heretofore, in using reading glasses, several adjustments had to be observed and kept up simultaneously, namely, proper distance of the lens from the print, proper position of the lens and the observer with reference to the available source of light, such as window or lamp, in order to avoid shadow of the lens and patches of varying illumination on the print due to dispersed images of the source of light, and reflected images of the source of light from the surfaces of the lens.

Since the field of vision is limited, in reading, the position of the lens has to be continually shifted and it was inconvenient and fatiguing to keep up the necessary adjustment; furthermore, there are often conditions where sufficient light is not available or the conditions of illumination are adverse to the adjustment necessary for the convenient use of the reading glass, for instance, in consulting telephone directories, books on commercial ratings or other works of reference.

This invention does away with the enumerated difficulties by obviating the necessity of focussing and positioning for illumination, for avoidance of shadows, for uneven distribution of light on the print and mirror effects from the surfaces of the lens.

The principal object of this invention is to make the use of reading glasses more efficient and convenient.

Among the other objects are to provide a reading glass having means to support the same at the proper distance from the magnified object, to properly light the object to be magnified, to provide a lighting unit having a source of current supply from a dry cell or from a house current.

Referring to the drawings:

Figure 3 is a detail sectional view of the lighting element.

Figure 4, is a view having parts broken out of a modified form showing the use of a dry cell for the source of current for the lighting means.

Figure 1:
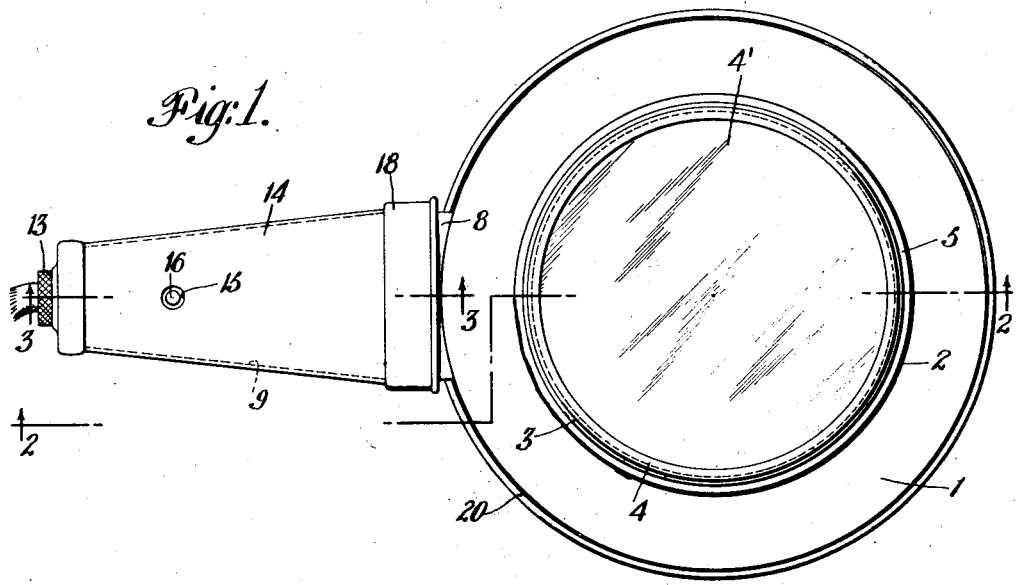
Figure 1 is a plan view of a device embodying the principles of my invention.
Figure 2:
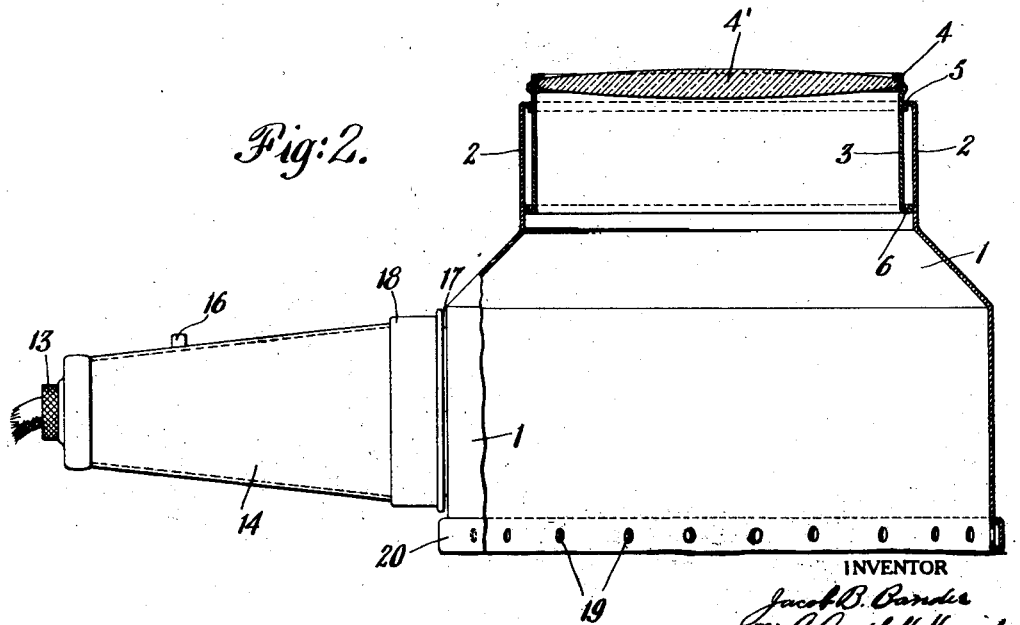
Figure 2 is a longitudinal sectional view of Figure 1 along the line 2, 2, looking in the direction of the arrows.

In carrying out my invention, I propose to provide a body portion 1 of metal such as aluminum or other suitable material having the property of diffusing light impinging thereon. The body portion 1 terminates at its top in collar 2. Within collar 2, neck 3 of lens holder 4 is adapted to fit and slide therein in frictional engagement. Collar 2 has turned over rim 5 which meshes with corresponding rim 6 on neck 3 to prevent accidental withdrawal of neck 3. Adjacent the base of body portion 1 is an opening 7 having a screw threaded neck 8 to receive the screw threaded end 8' of container 9. Within container 9 is lamp 10, threaded into socket 11 which has a bushing 12 passing through a hole 13 in the end of container 9. The end of bushing 12 carried a nut 13 to hold the socket 11 to the end of container 9. An asbestos cover 14 or other heat transmission resisting material covers container 9. Openings 15 permit the lugs 16 of the socket switch to protrude in order that the light may be turned on or off. In the use of the house current I have found that ventilation is essential to prevent heating of the body portion 1. Ports 19' in the container 9 permit air to emerge from container 9 and body portion 1 around the edge of collar 18 adjacent body portion 1. About the base of body portion 1, I provide ports 19. Body portion 1 has its lower edge 20 turned up to cover ports 19 but the turned up edge 20 is not in contact with body portion 1 to permit air to enter ports 19 and pass out of ports 17 around edge of collar 18. Such circulation of air cools the container handle 9 and body portion 1. The height of body portion 1 containing lens 4' is less than the focal length of the lens used.

In the modified form the usual flashlight 21 is adapted to screw into neck 8" after the lens has been removed from flashlight 21. The modified body portion 1' has been shown having a square-shape to permit of the device more readily being used in corners or against the turned over pages of a book.

Lens holder 4 can be moved either in or out as the user's eyesight requires, to adjust the lens 4' to accommodate the vision of the user.

The bent over rim 20 of body portion 1 permits of easy sliding of the body portion 1 over a printed page. The maintenance of the lens at the proper distance by an adjustable, fixed support, the proper lighting and the doing away with the normal lens shadow, lessen the eyestrain to the user and permits reading in a dimly lighted room.

What I claim is:—

1. A device of the kind described including an open bottomed body having a lower portion provided with a lateral opening adjacent the bottom end of the body, said body having its inner surface arranged to reflect and diffuse light entering said lateral opening, a lamp housing extending from said opening, a lamp in said housing, and a lens closing the upper end of the body.

2. A device of the kind described including an open bottomed body having a lower portion provided with a lateral opening adjacent the bottom end of the body, said body having its inner surface arranged to reflect and diffuse light entering said lateral opening, a lamp housing extending from said opening, a lamp in said housing, said body having its lower portion cylindrical and having a frusto-conical light reflecting and diffusing band above said cylindrical lower portion, and lens closing the upper end of the body.

3. A device of the kind described including an open bottomed body having a lower portion provided with a lateral opening adjacent the bottom end of the body, said body having its inner surface arranged to reflect and diffuse light entering said lateral opening, a lamp housing extending from said opening, a lamp in said housing, said body having its lower portion cylindrical and having a frusto-conical light reflecting and diffusing band above said cylindrical lower portion, and a lens closing the upper end of the body, said body having its upper end also cylindrical and of substantially the same diameter as the inner base of the frusto-conical band.

4. A device of the kind described including an open bottomed body having a lower portion provided with a lateral opening adjacent the bottom end of the body, said body having its inner surface arranged to reflect and diffuse light entering said lateral opening, a lamp housing extending from said opening, a lamp in said housing, and a lens closing the upper end of the body, said lens being at a greater distance from the lateral opening than the open bottom.

5. A device of the kind described including an open bottomed body having a lower portion provided with a lateral opening adjacent the bottom end of the body, said body having its inner surface arranged to reflect and diffuse light entering said lateral opening, a lamp housing extending from said opening, a lamp in said housing, a lens collar telescopically mounted in the upper end of said body, and a lens closing the upper end of the collar.

6. A device of the kind described including an open bottomed body having a lower portion provided with a lateral opening adjacent the bottom end of the body, said body having its inner surface arranged to reflect and diffuse light entering said lateral opening, a lamp housing extending from said opening, a lamp in said housing, a lens closing the upper end of the body, said body having a series of openings in its lower wall close to the lower edge of said wall, and an outwardly extending and upturned flange covering and spaced from said last mentioned openings.

Signed at New York, in the county of New York and State of New York, this 24th day of May, A. D. 1928.

JACOB B. BANDER.